Patented Nov. 13, 1934

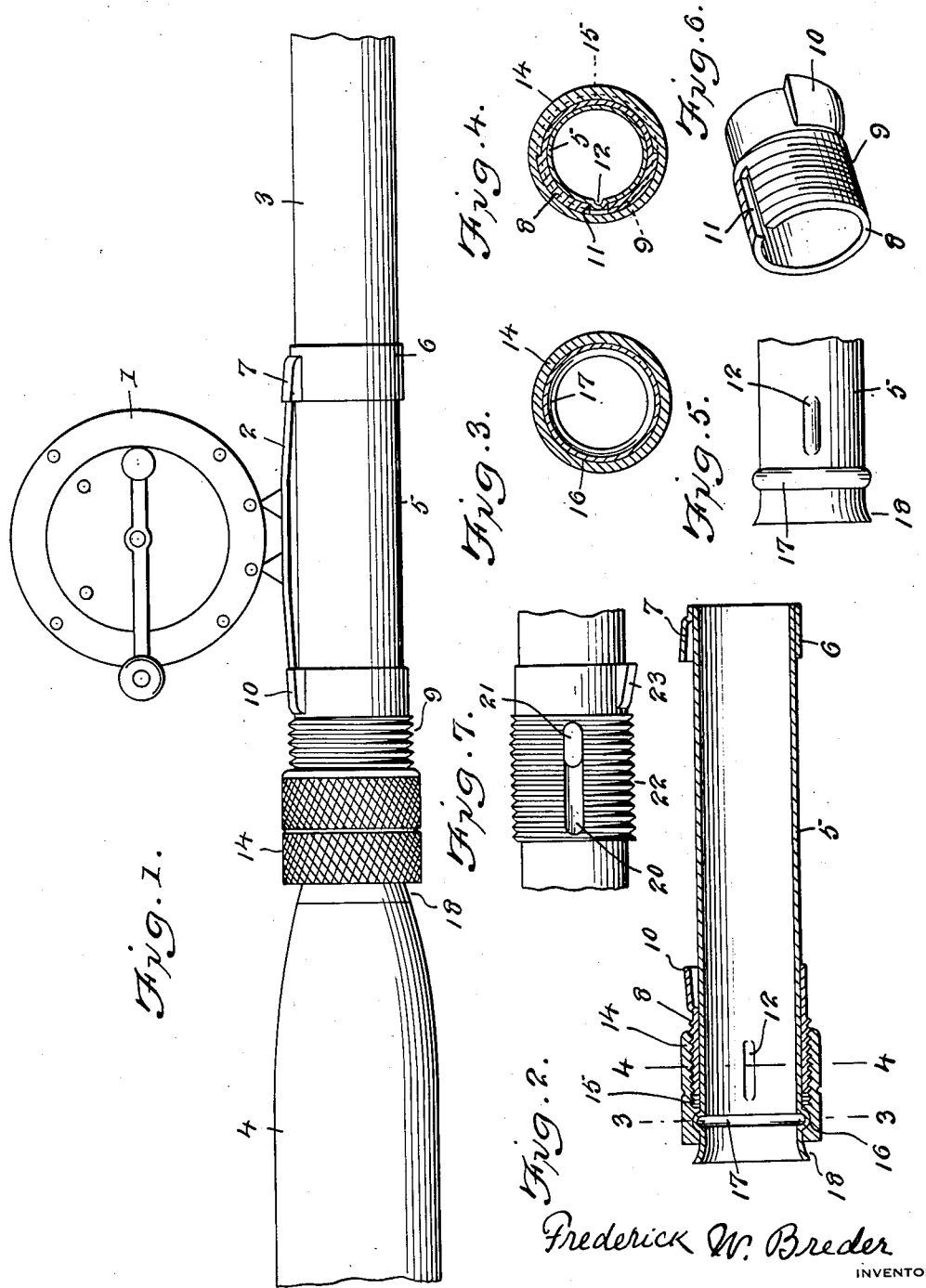

1,980,316

UNITED STATES PATENT OFFICE

1,980,316
REEL MOUNT FOR FISHING RODS

Frederick W. Breder, Houston, Tex.

Application January 13, 1933, Serial No. 651,595

8 Claims. (Cl. 43—22)

The present invention relates to a reel mount or reel holder for fishing rods.

Among the objects of the invention is the provision of a reel mount or holder for detachably securing a reel to a fishing rod, which will permit the reel to be readily, quickly and securely attached in position on the fishing rod, and which will also permit the reel to be quickly and easily dismounted from the rod.

A further object of the invention is to provide a device of the character described which is simple and sturdy in construction, simple in operation, effective in use, and cheap to manufacture.

The invention consists also in such other improvements and has for further objects such other operative advantages or results as may be found to obtain in the device hereinafter described or claimed.

In order that my invention may be clearly set forth and understood, I now describe it with reference to the accompanying drawing which illustrates devices embodying my invention. In the drawing, Figure 1 is an elevation of a portion of a fishing rod, and of a reel illustrating an application of the invention.

Figure 2 is a longitudinal sectional view of the reel or reel base securing means disconnected from the rod proper and handle of the fishing rod.

Figure 3 is a sectional view on the line 3—3 of Figure 2.

Figure 4 is a sectional view on the line 4—4 of Figure 2.

Figure 5 is a detail view of part of the carrier or barrel upon which parts of the device are mounted.

Figure 6 is a perspective view of the movable collar or follower sleeve which carries a cap or other securing means for engaging with one end of a reel base.

Figure 7 shows a side elevation of a modified form of the movable collar or sleeve shown in Figure 5.

Referring specifically to the drawing, the numeral 1 indicates a fishing reel equipped with a base 2. A portion of the fishing rod proper is indicated at 3, and the handle of the rod is indicated by the numeral 4.

The numeral 5 indicates a tubular or carrier member of metal or other suitable material attached to the rod 3 and handle 4 in any suitable way, as will be understood by the person skilled in the art. At one end of the tubular member 5 is fixedly secured a ring or collar 6 provided with a cap or hood 7 or other suitable securing means for engagement with and for holding one end of the reel base 2. The cap 7 forms a socket adapted to receive one end of the reel base 2 and holds that end securely. Near the opposite end of member 5, and surrounding the same, is a cylindrical or tubular member or collar 8, provided externally with a plurality of convolutions of screw threads 9 preferably of small pitch. The member 8 carries a cap or securing means 10 similar to cap or securing means 7, and adapted to be engaged with the free end of the reel base 2 after one end of the latter has been inserted in the socket of cap 7.

The collar or tubular member 8 fits closely around the tubular member 5, but not so close as to prevent movement of the member 8 relative to the member 5. The fit is such that the member 8 is capable of being readily moved longitudinally along the member 5. While this longitudinal movement is possible, yet it is preferred to prevent or restrain rotary movement of the member 8 about the member 5, or rotary movement of the member 8 about its own longitudinal axis, and to this end, the member 8 is provided with a slot 11 which slidingly engages the ridge or projection 12 on the member 5, which ridge or projection fits within the said slot 11. Thus the member 8 may be moved longitudinally along the member 5, but the member 8 may not be rotated to any appreciable extent about the member 5. The cap or securing means 10 carried by the member 8 is so positioned thereon relative to the slot 11 that when the parts are assembled as shown in Figure 2, the mouth of the socket of cap 10 will face the mouth of the socket of cap 7 and will be directly opposite thereto, and thus the longitudinal axes of the two caps 7 and 10 will be in a line parallel with the longitudinal axis of the fishing pole. The ridge or projection 12 on the member 5 may be formed by pressing part of the member 5 outwardly as shown in Figures 2, 4 and 5.

A collar or sleeve 14, having internal screw threads 15, adapted to mate with and engage screw threads 9 on collar or sleeve 8, is also provided about the member 5. The collar of sleeve 14 is also provided with an annular internal groove 16 which engages over an annular rib or projection 17 on the member 5, said annular rib or projection being preferably pressed outwardly from the metal or material of the member 5. The purpose of the annular rib and groove connection between the parts 5 and 14 is to provide for the rotation of the part 14 about the member 5, while preventing movement of the part 14 longitudinally of the part 5, the connection between these parts essentially forming a thrust bearing. The member 14 on its outer cylindrical surface is knurled as shown in Figure 1. The end of the tubular member 5 nearest the collar or sleeve 14 is preferably flared outwardly at 18 as shown in Figures 1, 2 and 5.

In operation, viewing the device from the rear, that is from the left of Figures 1 and 2, the knurled collar or sleeve 14 is rotated counter clockwise about the member 5, and the direction of the screw threads 9 and 15 respectively on parts 8 and 14 is such that the said counter clockwise rotation causes the sleeve or collar 8 and cap 10 to be retracted or drawn towards the handle 4. That is to say, the sleeve or collar 8 enters into the sleeve or collar 14. When the cap 10 has been sufficiently retracted to permit the reel base 2 to be inserted between the caps or securing means 7 and 10, one end of the reel base 2 is inserted into the cap 7 and the reel base 2 held down against the member 5, and longitudinally thereof, whereupon the sleeve or collar 14 is rotated in a clockwise direction. The clockwise motion of the collar or sleeve 14 will cause the member 8 and cap 10 to be advanced towards the cap 7, and during this advancing or forward motion of the cap 10, the cap 10 will be caused to fit over and secure the other end of the reel base 2. From the foregoing it will be observed that the cap or securing means 7 and 10 approach each other and hold the reel base 2 like the jaws of a vise. The collar or sleeve 14 is rotated, in mounting the reel, until the reel base is gripped and held with the desired security.

Figure 7 shows a modification of the collar or sleeve 8 shown in the other views. In this modification of the collar or sleeve 8, the slot 11 is closed at both ends, instead of being open at one end as shown in Figure 6. The slot is indicated in Figure 7 by the numeral 20, and the projection or rib, corresponding to rib 12, is indicated by means of the numeral 21. In this modification it is preferable to employ a few more screw threads 22 than in the case of the first modification described, and to make the rib or projection 21 somewhat shorter in length than the rib 12. The numeral 23 indicates a cap which corresponds in position and construction with cap 10. Otherwise, the device using the construction shown in Figure 7 is the same as the first modification described. The purpose of closing the slot 20 at the rear end, as shown in Figure 7, is to prevent the collar or sleeve being ejected from collar or sleeve 14 upon the continued clockwise rotation of the latter. If desired, the described direction of the screw threads 9 and 15 may be reversed. The parts of the reel mount may be made of metal such as brass, copper, etc., or even wholly or partially of non-metallic material such as artificial resins of the phenol-aldehyde condensation type, for example artificial material sold under the trade name of bakelite.

Having described my invention, I claim:

1. A reel holder comprising a cap adapted to receive one end of a reel base, a second cap movable towards and away from the said first mentioned cap for receiving and securing the other end of the reel base, a collar connected with said movable cap, said collar having external screw threads, a rotatable collar internally threaded, the threads thereof adapted to engage with the external threads on the first mentioned collar to cause the latter to be advanced towards and to be retracted from the first mentioned cap, means for preventing the movable cap from rotating relative to the first mentioned cap, and means for preventing motion of said rotatable collar towards or away from said first mentioned cap, while permitting rotation of said rotatable collar.

2. A reel holder comprising a cap on a tubular member and adapted to receive one end of a reel base, a second cap movable towards and away from said first mentioned cap for receiving and securing the other end of a reel base, a collar connected with said movable cap, said collar being disposed about said tubular member and movable longitudinally thereof, said collar also being externally threaded and having a slot lengthwise thereof, a projection on said tubular member adapted to fit into the slot in said collar to prevent relative rotation between the collar and the tubular member while permitting motion of the collar longitudinally of the tubular member, a rotatable collar internally threaded, the threads thereof adapted to engage with the external threads on the first mentioned collar to cause the latter to be advanced towards and to be retracted from the first mentioned cap, and means for preventing motion of said rotatable collar towards or away from said first mentioned cap while permitting rotation of said rotatable collar.

3. In a reel mount, the combination comprising a carrier, a cylindrical body disposed about the carrier, said cylindrical body carrying screw threads externally thereof and said cylindrical body adapted to be moved longitudinally of the carrier, a rotatable member having internal screw threads adapted to engage the threads upon the cylindrical body, means for holding the said rotatable member against motion longitudinally of the carrier and means to prevent rotary motion of the said cylindrical body relative to the carrier.

4. In a reel mount, a carrier, a rotatable sleeve, a thrust bearing between the said sleeve and said carrier, a second sleeve, means for engaging one end of a reel base carried by said second sleeve, said rotatable sleeve and said second sleeve having interengaging screw threads adapted, upon rotation of the rotatable sleeve, to cause the second sleeve to move longitudinally of its axis, and means for preventing any substantial rotary motion of the second sleeve about its axis.

5. A reel mount comprising the combination of a screw threaded sleeve, a rotatable screw threaded sleeve having its screw threaded portion engageable with the screw threaded portion of the first mentioned sleeve, and means for holding the said rotatable sleeve against motion longitudinally of the axis of the first mentioned sleeve.

6. A reel mount comprising the combination of a carrier, a screw threaded sleeve on said carrier and having means for securing one end of the base of a reel, a rotatable screw threaded sleeve having its threaded portion engageable with the screw threaded portion of said first mentioned sleeve and a thrust bearing for said rotatable sleeve.

7. A reel seat comprising a tubular shaft, a collar on one end of said shaft, a sleeve slidably and non-rotatably mounted on the shaft, said sleeve and collar having recesses formed therein to receive the reel, threads on the sleeve, a nut, threads on the nut engaging the threads on the sleeve, and means whereby the nut is held against longitudinal movement on the shaft.

8. A reel seat comprising a shaft, means on said shaft for receiving one end of a reel base, a sleeve slidably and non-rotatably mounted on the shaft, said sleeve having means to receive the other end of the reel base, means engaging said sleeve for moving it along the shaft and means for holding said last mentioned means against movement longitudinally of the shaft.

FREDERICK W. BREDER.